United States Patent
Li et al.

(10) Patent No.: US 10,939,123 B2
(45) Date of Patent: Mar. 2, 2021

(54) MULTI-ANGLE ADAPTIVE INTRA-FRAME PREDICTION-BASED POINT CLOUD ATTRIBUTE COMPRESSION METHOD

(71) Applicant: Peking University Shenzhen Graduate School, Guangdong (CN)

(72) Inventors: Ge Li, Guangdong (CN); Yi Ting Shao, Guangdong (CN); Hong Lian Wei, Guangdong (CN); Rong Gang Wang, Guangdong (CN); Tie Jun Huang, Guangdong (CN); Wen Gao, Guangdong (CN)

(73) Assignee: PEKING UNIVERSITY SHENZHEN GRADUATE SCHOOL

( * ) Notice: Subject to any disclaimer, the term of this patent is extended or adjusted under 35 U.S.C. 154(b) by 0 days.

(21) Appl. No.: 16/626,912

(22) PCT Filed: May 15, 2018

(86) PCT No.: PCT/CN2018/086791
§ 371 (c)(1),
(2) Date: Dec. 27, 2019

(87) PCT Pub. No.: WO2019/213986
PCT Pub. Date: Nov. 14, 2019

(65) Prior Publication Data
US 2020/0137399 A1    Apr. 30, 2020

(30) Foreign Application Priority Data

May 9, 2018 (CN) .......................... 201810435402.2

(51) Int. Cl.
*H04N 19/103*    (2014.01)
*H04N 19/159*    (2014.01)
(Continued)

(52) U.S. Cl.
CPC ......... *H04N 19/159* (2014.11); *H04N 19/103* (2014.11); *H04N 19/124* (2014.11);
(Continued)

(58) Field of Classification Search
None
See application file for complete search history.

(56) References Cited

U.S. PATENT DOCUMENTS 8,687,686 B2     4/2014 Lee et al.
10,499,054 B2 *  12/2019 Tian ..................... H04N 19/91
(Continued)

FOREIGN PATENT DOCUMENTS

CN    104700402 A    6/2015
CN    105160344 A    12/2015
(Continued)

OTHER PUBLICATIONS

International Search Report from PCT Application No. PCT/CN2018/086791 dated Jan. 23, 2019, pp. 1-4, including English translation.

*Primary Examiner* — Christopher G Findley
(74) *Attorney, Agent, or Firm* — The Belles Group, P.C.

(57) ABSTRACT

Disclosed is a multi-angle adaptive intra-frame prediction-based point cloud attribute compression method. A novel block structure-based intra-frame prediction scheme is provided for point cloud attribute information, where six prediction modes are provided to reduce information redundancy among different coding blocks and improve the point cloud attribute compression performance. The method comprises: (1) inputting a point cloud; (2) performing point cloud attribute color space conversion; (3) dividing a point cloud by using a K-dimensional (KD) tree to obtain coding blocks; (4) performing block structure-based multi-angle adaptive intra-frame prediction; (5) performing intra-frame
(Continued)

prediction mode decision; and (6) performing conversion, uniform quantization, and entropy encoding.

6 Claims, 7 Drawing Sheets

(51) Int. Cl.
    *H04N 19/124*     (2014.01)
    *H04N 19/176*     (2014.01)
    *H04N 19/61*     (2014.01)
    *H04N 19/625*     (2014.01)
    *H04N 19/91*     (2014.01)
    *H04N 19/96*     (2014.01)

(52) U.S. Cl.
    CPC .......... *H04N 19/176* (2014.11); *H04N 19/61* (2014.11); *H04N 19/625* (2014.11); *H04N 19/91* (2014.11); *H04N 19/96* (2014.11)

(56) References Cited

U.S. PATENT DOCUMENTS

| | | | |
|---|---|---|---|
| 10,789,733 B2* | 9/2020 | Mammou | G06T 7/20 |
| 2017/0214943 A1* | 7/2017 | Cohen | G06T 9/00 |
| 2019/0355152 A1 | 11/2019 | Li et al. | |
| 2020/0351519 A1* | 11/2020 | Sugio | H04N 19/103 |

FOREIGN PATENT DOCUMENTS

| | | |
|---|---|---|
| CN | 106803267 | 6/2017 |
| CN | 107403456 | 11/2017 |
| WO | WO2017126314 A1 | 7/2017 |

* cited by examiner

| Header information | Coded block 1 Prediction mode | Code block 1 Residual code stream | Coded block 2 Prediction mode | Code block 2 Residual code stream | ...... | Coded block i Prediction mode | Code block i Residual code stream |

Fig. 4

MULTI-ANGLE ADAPTIVE INTRA-FRAME PREDICTION-BASED POINT CLOUD ATTRIBUTE COMPRESSION METHOD

CROSS-REFERENCE TO RELATED PATENT APPLICATIONS

The present application is a U.S. national stage application under 35 U.S.C. § 371 of PCT Application No. PCT/CN2018/086791, filed May 15, 2018, which claims priority to Chinese Patent Application No. 2018104354022, filed May 9, 2018. The disclosures of the aforementioned priority applications are incorporated herein by reference in their entireties.

FIELD OF THE INVENTION

The invention belongs to the technical field of point cloud data processing, and relates to a point cloud data compression method, in particular to a point cloud attribute compression method based on multi-angle self-adaptive intra prediction.

BACKGROUND OF THE INVENTION

With the increasing demand of people for three-dimensional vision, three-dimensional point cloud, as an important form of digital representation in the real world, plays a technical support role in many popular studies such as smart city, unmanned, cultural relics protection and so on. With the rapid development of three-dimensional scanning equipment (laser, radar, etc.), the precision and resolution of point cloud are higher. High-precision point cloud is widely used in urban digital map construction. The point cloud is obtained by sampling the surface of an object by a three-dimensional scanning device, the number of points of a frame of point cloud is generally millions of levels, each point contains geometric information, color, texture and other attribute information, and the data volume is extremely large. The huge data volume of three-dimensional point cloud brings great challenges to data storage and transmission, so point cloud compression is very necessary.

The point cloud compression is mainly divided into geometric compression and attribute compression, and the existing point cloud attribute compression framework mainly comprises:

I. A method based on octree decomposition and DCT for Discrete Cosine Transform comprises the following steps: firstly, carrying out spatial decomposition on the point cloud by using an octree to obtain a coded block, then carrying out depth-first traversal on the tree, writing traversed node color values into a two-dimensional JPEG table according to a serpentine sequence, and then encoding the obtained point cloud color table by using an existing JPEG encoder, wherein the JPEG encoder uses DCT. According to the method, an existing encoder is utilized, the calculation complexity is low, but the spatial correlation between points is not fully utilized, and the compression performance needs to be improved;

II. A method based on octree decomposition and graph transformation comprises the following steps: firstly, performing spatial decomposition on the point cloud by using an octree, and partitioning the point cloud into specific layers to obtain a transformation block; forming a graph in each transformation block, connecting two points with the distance not exceeding 1 along any coordinate axis by one side, wherein the weight of the side is inversely proportional to the Euclidean distance; and then carrying out graph transformation on the attribute information of the nodes in the graph. The compression performance of the method is good; however, the operation complexity is high. The composition mode can bring subpicture problems, influence the efficiency of graph transformation, and thus there is still a lot to be improved;

III. A method based on KD tree decomposition and graph transformation comprises the following steps: firstly, performing spatial decomposition on a point cloud by using a KD tree, and partitioning the point cloud into transformation blocks to a certain depth to obtain transformation blocks, wherein the number of points contained in each transformation block is approximately the same; in the transformation block, every two points are connected by a side, the weight of the side is related to the Euclidean distance, and the set Euclidean distance threshold of the side determines the sparsity of the graph; and then carrying out graph transformation on the attribute information of the points in the graph. The method completely solves the subpicture problem, meanwhile, the compression performance is greatly improved compared with the former two methods, but the operation complexity is high, and the performance still needs to be improved.

SUMMARY OF THE INVENTION

In order to overcome the defects of the prior art and further improve the compression performance of the point cloud attribute under the condition of considering the computational complexity, the invention provides a method for compressing the point cloud attribute based on multi-angle self-adaptive intra prediction, which provides six prediction modes by using a novel intra prediction scheme based on a block structure to reduce the redundant information among different coded blocks of the point cloud as much as possible and improve the compression performance of the point cloud attribute.

The six prediction modes provided by the invention basically cover all the predictable directions and provide a complete set of multi-angle self-adaptive intra prediction methods.

The technical scheme provided by the invention is as follows:

A point cloud attribute compression method based on multi-angle self-adaptive intra prediction is characterized in that a KD tree is used for dividing a point cloud coded block aiming at point cloud data, the coded blocks are numbered according to a breadth first traversal sequence, the coded blocks are processed one by one according to a point cloud intra prediction scheme with six prediction modes according to the numbering sequence, an optimal prediction mode is selected according to a mode decision, and a prediction residual is transformed, quantized and entropy coded to achieve the optimum performance of point cloud attribute compression; the method comprises the following steps:

1) Color space conversion of point cloud attributes: reading in point cloud attribute information to-be-processed, and converting a point cloud color space from an RGB space to a YUV space according to the visual characteristics of human eyes and the difficulty in compression processing;

2) Dividing the point cloud by adopting a KD tree to obtain a coded block: carrying out KD tree division on the point cloud according to the geometric information, selecting a coordinate axis with the maximum distribution variance in the point cloud position coordinate as a division axis each time, selecting a point with the coordinate size being a median value as a division point, and iteratively dividing until the set KD tree depth is reached; the block obtained by the last layer of KD tree division is a coded block of the point cloud, and numbering the coded blocks according to the breadth traversal sequence;

The numbering sequence of the point cloud coded blocks is used as a prediction sequence of later-stage point cloud intra prediction.

And (3) intra prediction based on a block structure: sequentially carrying out intra prediction on the coded blocks according to the numbering sequence of the coded blocks, wherein the coded blocks have six prediction modes.

According to prediction mode 1, 128 is used as the prediction reference value of the Y luminance component of the current block $b_{i+1}$, and the U and V chrominance components are not predicted, which is called "DC mode";

According to prediction mode 2, $Y_{i+1}$, $U_{i+1}$, $V_{i+1}$ are predicted by the mean values $\overline{Y_I}$, $\overline{U_I}$, $\overline{V_I}$ of all the points Y, U, V components reconstructed by the first block $b_i$; according to prediction mode 3, $Y_{i+1}$, $U_{i+1}$, $V_{i+1}$ are predicted by the mean values $\overline{Y_{I-1}}$, $\overline{U_{I-1}}$, $\overline{V_{I-1}}$ of all the points Y, U, V components reconstructed by the first two blocks $b_{i-1}$; according to prediction mode 4, $Y_k$, $U_k$, $V_k$ are predicted by the mean values $\overline{Y_{I-2}}$, $\overline{U_{I-2}}$, $\overline{V_{I-2}}$ of all the points Y, U, V components reconstructed by the first three blocks. These three prediction modes are multi-angle predictions between KD tree leaf child nodes.

According to prediction mode 5, the mean values $$\overline{Y_{(ceil(\frac{k}{2})-1)}}, \overline{U_{(ceil(\frac{k}{2})-1)}}, \overline{V_{(ceil(\frac{k}{2})-1)}}$$

of all the points Y, U, V components reconstructed using the previous parent node of the previous layer of the KD tree parent node of the current block $b_{i+1}$, is used as the reference value of the $Y_{i+1}$, $U_{i+1}$, $V_{i+1}$ components of the current leaf child nodes for prediction; according to prediction mode 6, the mean values $$\overline{Y_{(ceil(\frac{k}{2})-2)}}, \overline{U_{(ceil(\frac{k}{2})-2)}}, \overline{V_{(ceil(\frac{k}{2})-2)}}$$

of all the points Y U, V components reconstructed using the forward second parent node of the previous layer of the KD tree parent node of the current block $b_{i+1}$ is used as the reference value of the $Y_{i+1}$, $U_{i+1}$, $V_{i+1}$ components of the current leaf child nodes for prediction. The two prediction modes provide a more flexible prediction scheme for multi-angle prediction across layers between leaf child nodes and parent nodes of the KD tree, and are favorable for removing redundant information from the coded blocks.

When the first coded block $b_1$ is subjected to intra prediction, only prediction mode 1 can be used; when the second coded block $b_2$ is subjected to intra prediction, prediction mode 1 and prediction mode 2 can be predicted; when the third coded block $b_3$ is subjected to intra prediction, prediction mode 1, prediction mode 2, prediction mode 3 and prediction mode 5 can be used; when the fourth coded block $b_k$ is subjected to intra prediction, a prediction mode 1, a prediction mode 2, a prediction mode 3, a prediction mode 4 and a prediction mode 5 can be used; when the coded block $b_k$ numbered k≥5 is intra-predicted, six prediction modes can be used.

4) Intra prediction mode decision: for color components $Y_k$, $U_k$, $V_k$ prediction of coded block $b_k$ (k≥2), mode decision is needed to select the optimum prediction mode, while the first coded block does not need to make mode decision; a cost of a prediction mode is estimated using a Sum of Absolute Transformed Difference (SATD) of a prediction residual transform coefficient, wherein the prediction residual is transformed using a Discrete Cosine Transform (DCT); the smaller the SATD value, the lower the cost of representing the prediction mode, the better the prediction performance, and the mode with the smallest SATD is selected as the prediction mode of the current block;

5) Generation of a point cloud attribute compressed code stream: all coded blocks are processed according to a coding sequence, DCT transformation, uniform quantization and entropy coding are carried on the predicted residual to obtain a final code stream with compressed point cloud attributes;

The color space conversion in the step 1) comprises the following steps:

(1-1) Points $p_k$ in the point cloud have color values $r_k, g_k, b_k$ of an RGB color space, RGB is converted into a YUV color space through a color space conversion matrix, and the color values are $y_k, u_k, v_k$;

(1-2) The mathematical expression for color space conversion is:

$$[y_k, u_k, v_k] = [r_k, g_k, b_k] \times \begin{bmatrix} 0.2126 & 0.7152 & 0.0722 \\ -0.1146 & -0.3854 & 0.5 \\ 0.5 & -0.4542 & -0.0458 \end{bmatrix} \quad \text{(Formula 1)}$$

The coded blocks in the step 2) are divided and numbered according to the following steps: when the KD tree is divided, a coordinate axis with the largest distribution variance of the points is selected as a division axis, and the correlation of the points in the transformation block is fully considered; meanwhile, the point with the coordinate on the division axis being a median value is taken as a division point, so that the number of points in the transformation block is basically the same. N points are set for the point cloud to be processed, wherein the division depth set by the KD tree is d, and $2^d$ coded blocks are obtained after the point cloud is divided d times; all coded blocks are numbered $b_1$, $b_2, \ldots, b_k, \ldots, b_{2^d}$ in the breadth traversal sequence. According to the intra prediction based on the coded block sequence in the step 3), the prediction reference value of the coded block is as shown in table 1:

TABLE 1

Color component reference values for intra prediction of coded blocks

| Coded blocks $b_k$ | Prediction mode | $Y_k$ reference value | $U_k$ reference value | $V_k$ reference value |
|---|---|---|---|---|
| k = 1 | 1 | 128 | 0 | 0 |
| k = 2 | 1 | 128 | 0 | 0 |
|  | 2 | $\overline{Y_I}$ | $\overline{U_I}$ | $\overline{V_I}$ |
| k = 3 | 1 | 128 | 0 | 0 |
|  | 2 | $\overline{Y_I}$ | $\overline{U_I}$ | $\overline{V_I}$ |
|  | 3 | $\overline{Y_{I-1}}$ | $\overline{U_{I-1}}$ | $\overline{V_{I-1}}$ |
|  | 5 | $\overline{Y_{(ceil(\frac{k}{2})-1)}}$ | $\overline{U_{(ceil(\frac{k}{2})-1)}}$ | $\overline{V_{(ceil(\frac{k}{2})-1)}}$ |
| k = 4 | 1 | 128 | 0 | 0 |
|  | 2 | $\overline{Y_I}$ | $\overline{U_I}$ | $\overline{V_I}$ |
|  | 3 | $\overline{Y_{I-1}}$ | $\overline{U_{I-1}}$ | $\overline{V_{I-1}}$ |
|  | 4 | $\overline{Y_{I-2}}$ | $\overline{U_{I-2}}$ | $\overline{V_{I-2}}$ |

TABLE 1-continued

Color component reference values for intra prediction of coded blocks

| Coded blocks $b_k$ | Prediction mode | $Y_k$ reference value | $U_k$ reference value | $V_k$ reference value |
|---|---|---|---|---|
| | 5 | $\overline{Y_{(ceil(\frac{k}{2})-1)}}$ | $\overline{U_{(ceil(\frac{k}{2})-1)}}$ | $\overline{V_{(ceil(\frac{k}{2})-1)}}$ |
| $k \geq 5$ | 1 | 128 | 0 | 0 |
| | 2 | $\overline{Y_l}$ | $\overline{U_l}$ | $\overline{V_l}$ |
| | 3 | $\overline{Y_{l-1}}$ | $\overline{U_{l-1}}$ | $\overline{V_{l-1}}$ |
| | 4 | $\overline{Y_{l-2}}$ | $\overline{U_{l-2}}$ | $\overline{V_{l-2}}$ |
| | 5 | $\overline{Y_{(ceil(\frac{k}{2})-1)}}$ | $\overline{U_{(ceil(\frac{k}{2})-1)}}$ | $\overline{V_{(ceil(\frac{k}{2})-1)}}$ |
| | 6 | $\overline{Y_{(ceil(\frac{k}{2})-2)}}$ | $\overline{U_{(ceil(\frac{k}{2})-2)}}$ | $\overline{V_{(ceil(\frac{k}{2})-2)}}$ |

The mode decision of the intra prediction described in the step 4) above comprises the following steps: the prediction reference values of the color components $Y_k$, $U_k$, $V_k$ of the coded block $b_k$ ($k \neq 1$) are $Y_{k\_ref}$, $U_{k\_ref}$, $V_{k\_ref}$, respectively, the prediction residual $b_{k(res)}$ is calculated by Formula 2, the cost SATD of the prediction mode is calculated by Formula 3, and the mode with the smallest SATD is selected as the optimal prediction mode:

$$b_{k(res)} = (Y_k - Y_{k\_ref}) + (U_k - U_{k\_ref}) + (V_k - V_{k\_ref}) \quad \text{(Formula 2)}$$

$$\text{SATD} = \text{sum}(\text{abs}(\text{DCT}(b_{k(res)}))) \quad \text{(Formula 3)}$$

The generation of the point cloud attribute compressed code stream in the step 5) is as follows:

(5-1) Coded block prediction residuals with serial numbers and prediction mode information thereof are obtained from processing in the steps 1) to 4); DCT transformation, uniform quantization and binarization are carried out on the prediction residual to obtain a code stream of attribute information, and a final point cloud attribute compressed code stream is obtained combining prediction mode information of a coded block, and through entropy encoding;

(5-2) The performance of the point cloud attribute compression is measured by a code rate and a peak signal to noise ratio (PSNR), wherein the code rate which can be obtained by dividing the total number of bits of a code word by the number of points of the point cloud is in bpp (bits per point), and PSNR is in decibel dB; the smaller the bit rate, the larger the PSNR, the better the compression performance of point cloud performance.

According to the method, intra prediction is used for reducing redundant information among coded blocks, six prediction modes are provided, the optimum mode is selected through mode decision, the traditional DCT transformation is used for compressing the point cloud attribute, the calculation complexity is low, the attribute compression efficiency is high, and the better point cloud compression performance is realized.

Compared with the prior art, the invention has the beneficial effects that:

The invention provides a point cloud attribute compression method based on multi-angle self-adaptive intra-frame prediction, which has the following technical advantages:

(I) A new intra prediction scheme is proposed, which enables six prediction modes and effectively reduces the redundancy of attribute information between coded blocks.

(II) When different coded blocks are processed, the optimum prediction mode is selected through mode decision, and the optimum compression performance of point cloud compression is realized.

(III) A direct current prediction mode, multi-angle prediction among three KD tree leaf child nodes and cross-level multi-angle prediction between two KD tree leaf child nodes and a parent node in the prediction mode are enabled in the prediction mode; this flexible prediction scheme facilitates the removal of redundant information within coded blocks of different characteristics.

BRIEF DESCRIPTION OF THE DRAWINGS

FIG. 4 is a diagram illustrating a code stream structure after point cloud attribute information compression.

Wherein (a) longdress_vox10_1300.ply is tested; (b) Shiva35. Ply is tested; (c) Queen frame 0200. Ply is tested.

DETAILED DESCRIPTION OF THE INVENTION

The invention will now be further described, by way of example, with reference to the accompanying drawings, which do not limit the scope of the invention in any way.

Figure 1:
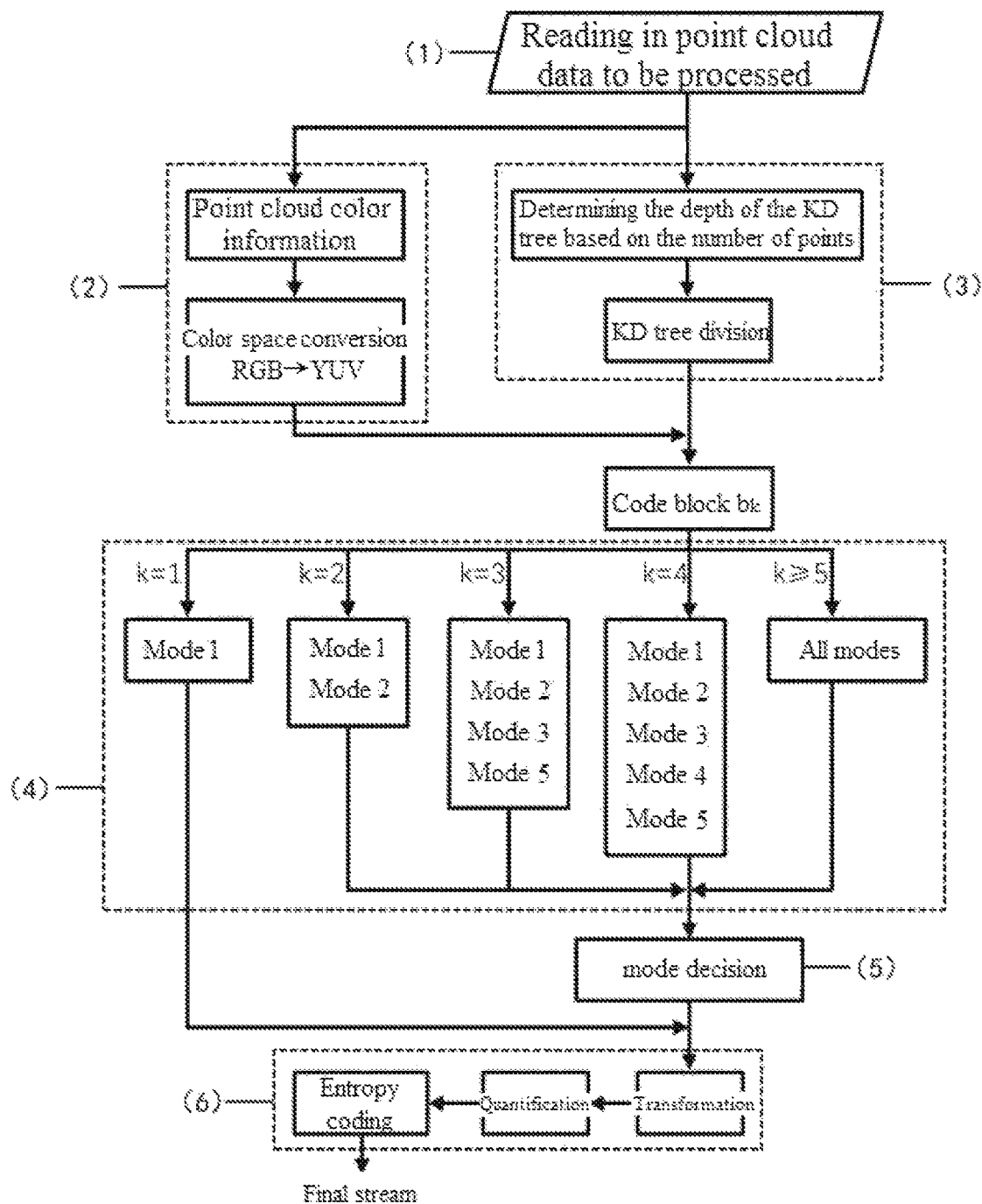
FIG. 1 is a flow diagram of a method provided by the present invention.

According to the point cloud attribute compression method based on the multi-angle self-adaptive intra prediction, aiming at the point cloud data, a novel intra prediction scheme based on a block structure is provided, six prediction modes are provided, so that redundant information among different coded blocks of the point cloud is reduced as much as possible, and compression performance of the point cloud attribute is improved; FIG. 1 is a flow diagram of the method of the present invention.

In the following, aiming at an official point cloud data set longdress_vox10_1300.ply, Shiva35.ply and Queen_frame_0200.ply in an MPEG point cloud compression working group, point cloud attribute compression is carried out by adopting the method provided by the invention, and as shown in FIG. 1, specific implementation steps are as follows:

(1) Color space conversion of point cloud attributes: point cloud attribute information to-be-processed is read in, wherein a point $p_k$ in the point cloud has the color values of the RGB color space $r_k$, $g_k$, $b_k$, the RGB is converted into a YUV color space through a color space conversion matrix, and the color values are $y_k$, $u_k$, $v_k$ as shown in Formula 1:

$$[y_k, u_k, v_k] = [r_k, g_k, b_k] \times \begin{bmatrix} 0.2126 & 0.7152 & 0.0722 \\ -0.1146 & -0.3854 & 0.5 \\ 0.5 & -0.4542 & -0.0458 \end{bmatrix} \quad \text{(Formula 1)}$$

The RGB color values of the first point $p_1$ of the point cloud longquality_vox10_1300.ply are (102, 94, 87), and the YUV color values are (54.4128, −2.7926, 50.3798) obtained by processing the color conversion matrix.

The RGB color values of the first point $p_1$ of the point cloud Shiva35.ply are (125, 88, 54), and the YUV color values are (43.4902, 30.9580, 50.5518) obtained by processing the color conversion matrix.

RGB color values of the first point $p_1$ of the point cloud Queen_frame_0200.ply are (102, 80, 71), and YUV color values are (48.0172, 9.8702, 44.1126) obtained by processing the color conversion matrix.

Figure 2:
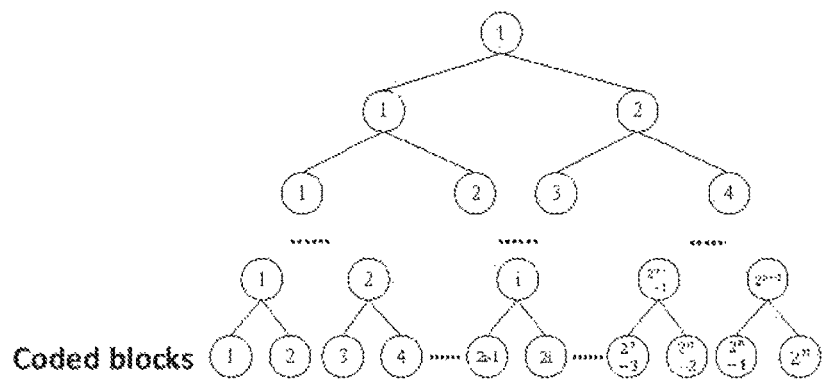
FIG. 2 is an example diagram of KD tree partitioning and coded block numbering for a point cloud.
Figure 3A:
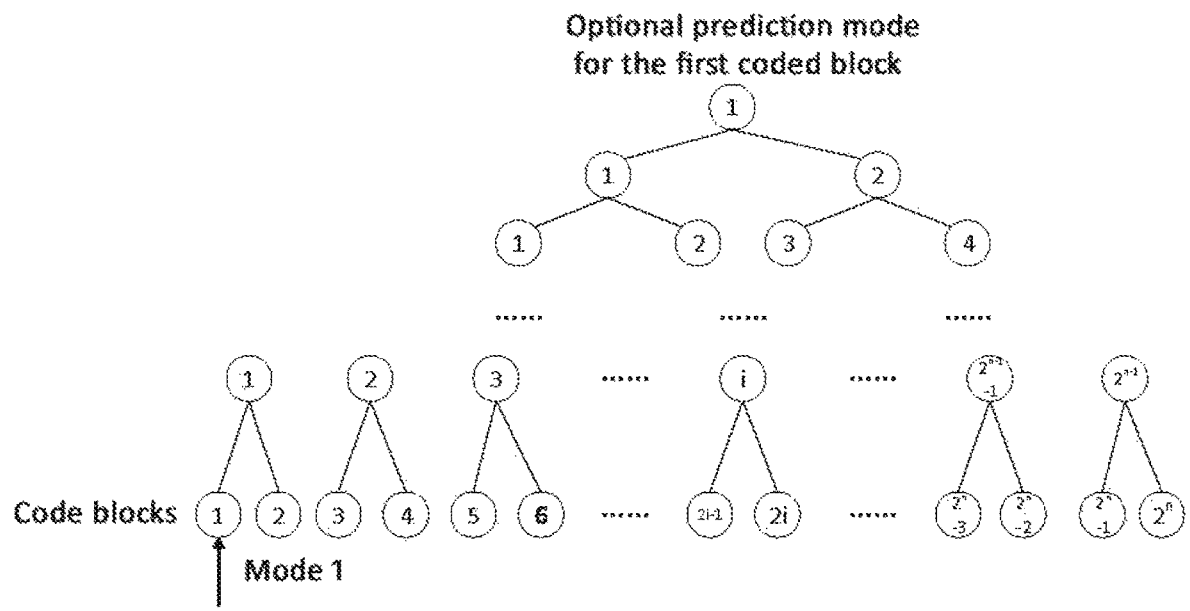
FIG. 3 is a schematic diagram of alternative prediction modes for five different coded blocks.
Figure 3B:
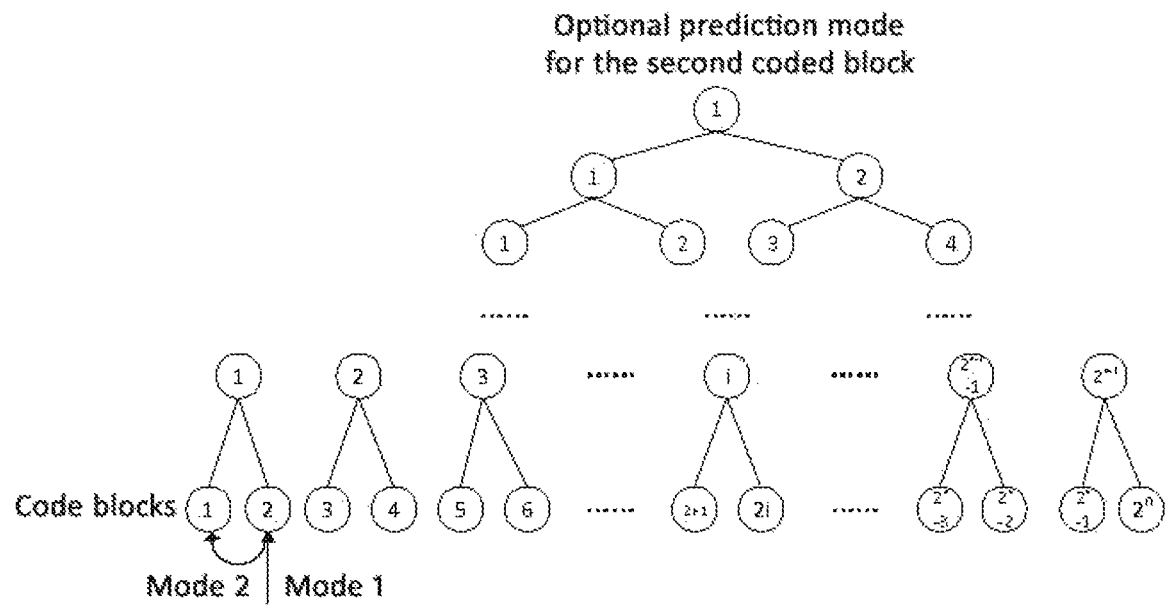
Figure 3C:
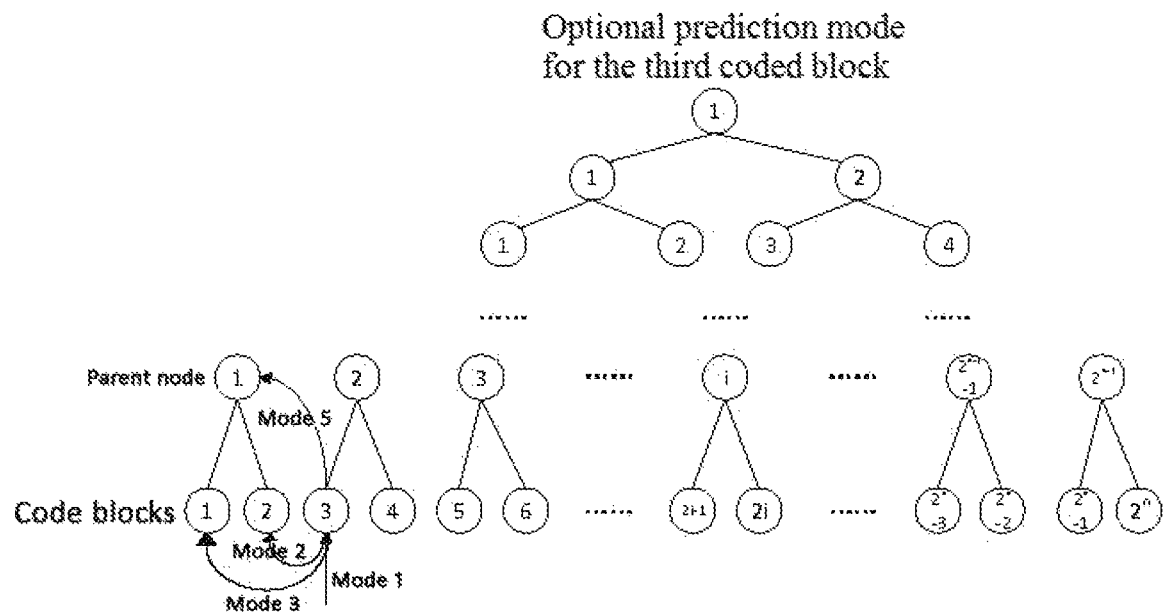
Figure 3D:
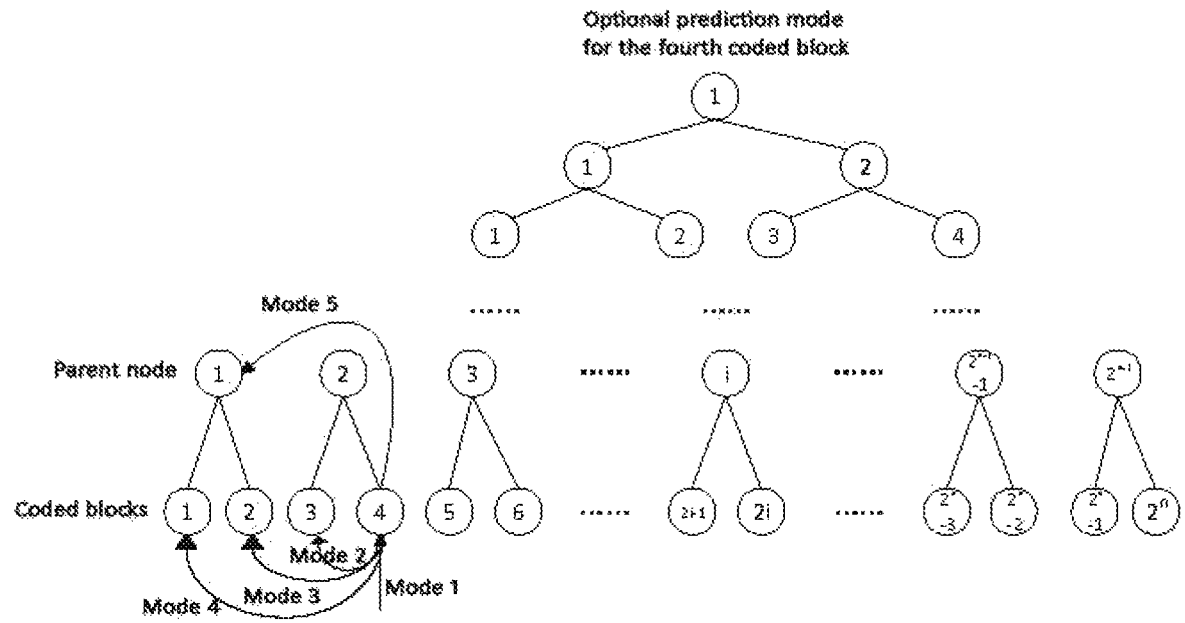
Figure 3E:
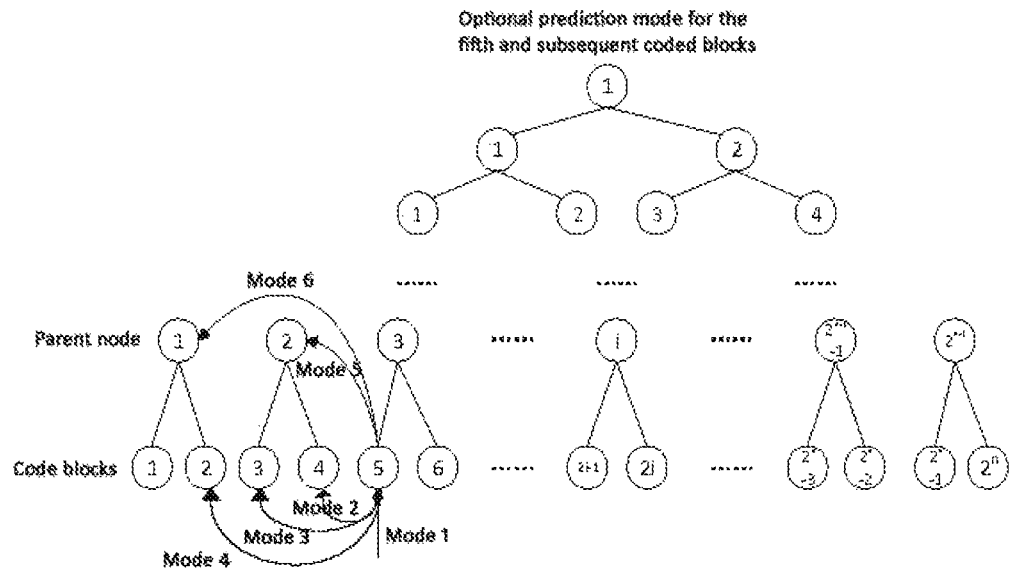

(2) Dividing the point cloud by adopting a KD tree to obtain a coded block: the KD tree is essentially a binary tree, when the point cloud is divided into KD trees, each time a coordinate axis with the largest distribution variance in the position coordinates of the point cloud is selected as a division axis, a point with the coordinate size being a median value is selected on the axis as a division point, iterative division is carried out until a set KD tree depth is reached, and the KD trees and coded blocks with numbers after division are shown in FIG. 2.

The point cloud longdress_vox10_1300.ply has 857966 points, the KD tree partition depth d is set to 13, and the number of points in the divided block is 104 or 105.

The point cloud Shiva35.ply has 1010591 points, the KD tree partition depth d is set to 13, and the number of points in the divided block is 123 or 124.

The point cloud Queen_frame_0200.ply has 1000993 points, the KD tree partition depth d is set to 13, and the number of points in the divided block is 122 or 123.

(3) Intra prediction based on block structure: through the spatial division of point cloud in the step (2), all the points are divided into a certain number of coded blocks according to the spatial position relation, wherein the sequence of the coded blocks is determined by the breadth traversal sequence of tree division, and then intra prediction is carried out on the coded blocks in sequence according to the numbering sequence. The point clouds longdress_vox10_1300.ply Shiva35.ply and Queen_frame_0200.ply all have 8192 coded blocks, and all points within each block can be regarded as a category.

(3-1) When intra prediction is carried out on the first coded block $b_1$, 128 is used as a prediction reference value of the Y component;

For example, the first point RGB color value of the first coded block $b_1$ of the point cloud longquality_vox1O_1300.ply is (131, 96, 72), the color-converted YUV color value is (52.85, 23.99, 54.16) and the color-predicted residual value is (−75.15, 23.99, 54.16).

(3-2) When intra prediction is carried out on the second coded block $b_2$, according to prediction mode 1, 128 is used as the prediction reference value of Y component; according to prediction mode 2, $Y_i$, $U_i$, $V_i$ are predicted by the mean values $\overline{Y}$, $\overline{U}$, $\overline{V}$ of all the points Y, U, V components reconstructed by the first block $b_1$.

(3-3) When intra prediction is carried out on the third coded block $b_3$, according to prediction mode 1, 128 is used as the prediction reference value of Y component; according to prediction mode 2, $Y_i$, $U_i$, $V_i$ are predicted by the mean values $\overline{Y}$, $\overline{U}$, $\overline{V}$ of all the points Y, U, V components reconstructed by the previous block $b_2$; according to prediction mode 3, $Y_i$, $U_i$, $V_i$ are predicted by the mean values $\overline{Y}$, $\overline{U}$, $\overline{V}$ of all the points Y U, V components reconstructed by the first two blocks $b_1$; according to prediction mode 5, the mean values of all the points Y U, V components reconstructed by the forward macroblock $Mb_1$ of the parent node $Mb_2$ of the current block $b_3$ are used as reference values for the $Y_k$, $U_k$, $V_k$ component prediction of the current block $b_3$.

(3-4) When intra prediction is carried out on the fourth coded block $b_4$, according to prediction mode 1, 128 is used as the prediction reference value of Y component; according to prediction mode 2, $Y_i$, $U_i$, $V_i$ are predicted by the mean values $\overline{Y}$, $\overline{U}$, $\overline{V}$ of all the points Y, U, V components reconstructed by the previous block $b_3$; according to prediction mode 3, $Y_k$, $U_k$, $V_k$ are predicted by the mean values $\overline{Y}$, $\overline{U}$, $\overline{V}$ of all the points Y, U, V components reconstructed by the first two blocks $b_{i-1}$; according to prediction mode 4, $Y_k$, $U_k$, $V_k$ are predicted by the mean values $\overline{Y}$, $\overline{U}$, $\overline{V}$ of all the points Y, U, V components reconstructed by the first three blocks; according to prediction mode 5, the mean values of all the points Y U, V components reconstructed by the forward macroblock $Mb_1$ of the parent node $Mb_2$ of the current block $b_4$ are used as reference values for the $Y_k$, $U_k$, $V_k$ component prediction of the current block $b_4$;

(3-5) When intra prediction is carried out on the coded block $b_k (k \geq 5)$, according to prediction mode 1, 128 is used as the prediction reference value of Y component; according to prediction mode 2, $Y_k$, $U_k$, $V_k$ are predicted by the mean values $Y_i$, $U_i$, $V_i$ of all the points Y, U, V components reconstructed by the previous block $b_1$; according to prediction mode 3, $Y_k$, $U_k$, $V_k$ are predicted by the mean values $Y_{i-1}$, $U_{i-1}$, $V_{i-1}$ of all the points Y, U, V components reconstructed by the first two blocks $b_{i-1}$; according to prediction mode 4, $Y_k$, $U_k$, $V_k$ are predicted by the mean values $Y_{i-2}$, $U_{i-2}$, $V_{i-2}$ of all the points Y, U, V components reconstructed by the first three blocks $b_{i-1}$; according to prediction mode 5, the mean values of all the points Y, U, V components reconstructed by the forward macroblock $$Mb_{\left(ceil\left(\frac{k}{2}\right)-1\right)}$$

of the parent node $$Mb_{\left(ceil\left(\frac{k}{2}\right)\right)}$$

or the current block $b_k$ are used as reference values for the $Y_k$, $U_k$, $V_k$ component prediction of the current block; according to prediction mode 6, the mean values of all the points Y, U, V components reconstructed by the second forward macroblock $$Mb_{\left(ceil\left(\frac{k}{2}\right)-1\right)}$$

of the parent node $$Mb_{\left(ceil\left(\frac{k}{2}\right)-1\right)}$$

of the current block $b_k$ are used as reference values for the $Y_k$, $U_k$, $V_k$ component prediction of the current block;

(4) Intra prediction mode decision: there are many prediction modes for color components $Y_k$, $U_k$, $V_k$ of coded block $b_k$ (k≠1), the cost of each mode needs to be estimated to make mode decision and select the optimum prediction mode; the SATD is used to estimate the cost of the prediction mode, where the DCT is used to transform the prediction residue, and the mode with the smallest SATD will be selected as the prediction mode of the current block.

(5) Generation of a point cloud attribute compressed code stream: 8192 coded blocks of the point cloud longquality_vox10_1300.ply, 8192 coded blocks of Shiva35.ply and 8192 coded blocks of the Queen_frame_0200.ply, color information in the blocks is subjected to prediction, DCT transformation, quantization and entropy coding processing in sequence, and then code stream information of a prediction mode and a transformation mode is combined to be written into a code stream file according to the sequence of the coded blocks. The structure of the final code stream file is shown in FIG. 3. The performance of point cloud attribute compression is measured by the code rate in bpp (bits per point) and PSNR (Peak Signal to Noise Ratio) in decibel dB.

Figure 5A:
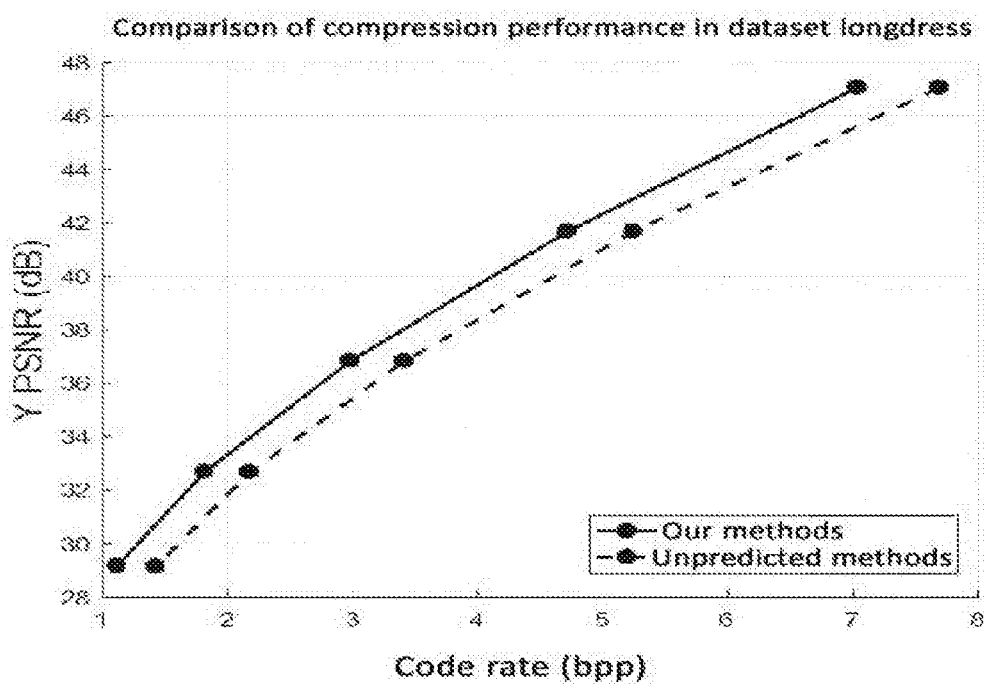
FIG. 5 is a graph comparing the compression performance of the method of the present invention with that of the conventional method.
Figure 5B:
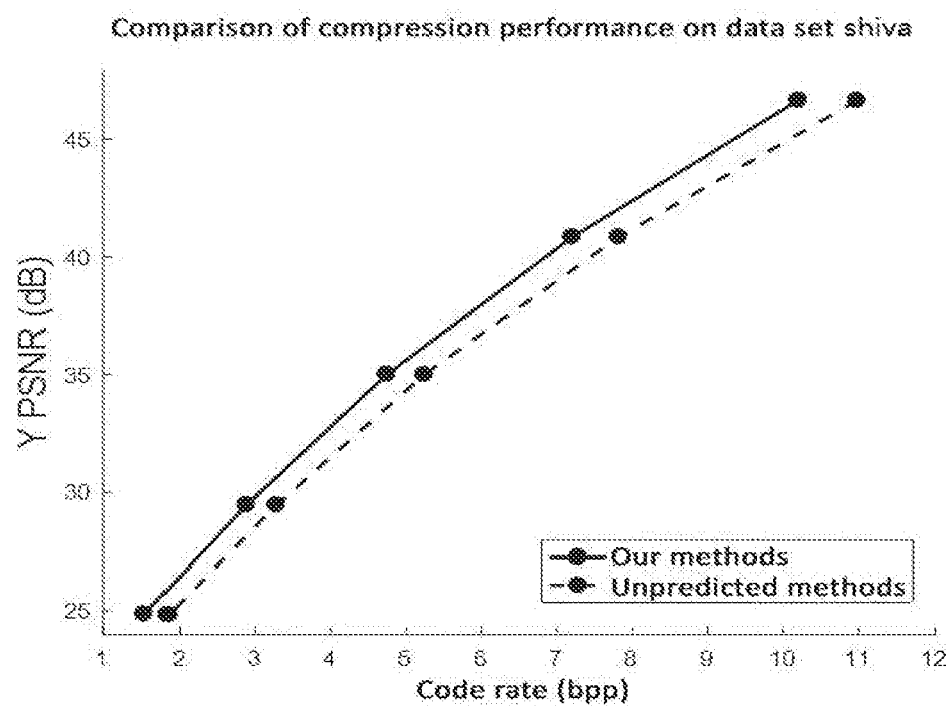
Figure 5C:
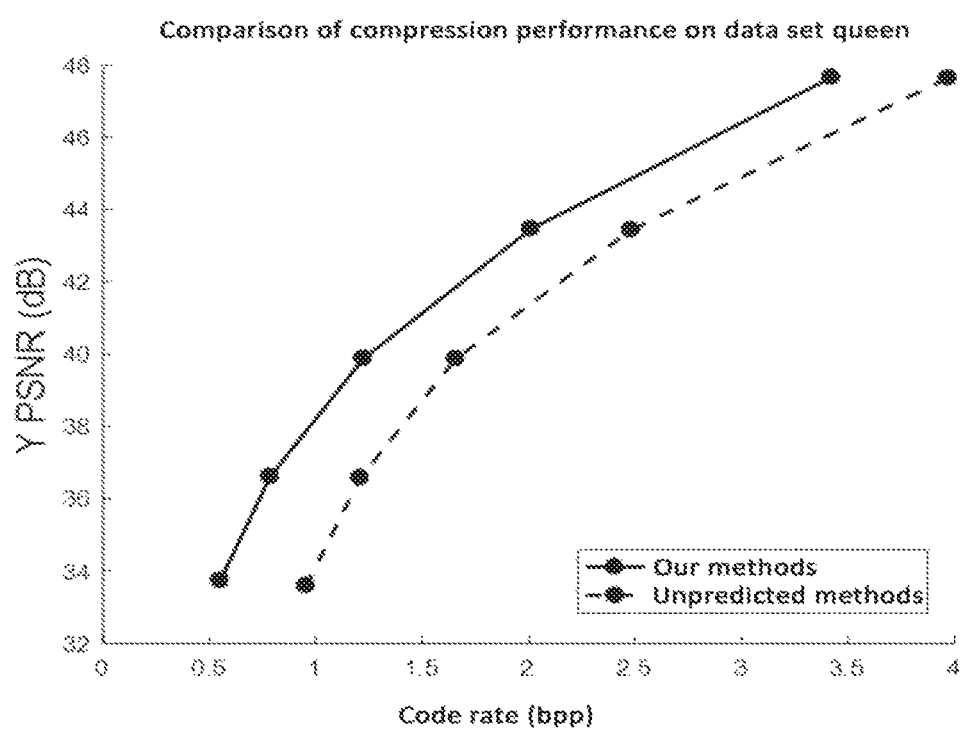

In order to verify the effect of the point cloud attribute compression method based on multi-angle self-adaptive intra prediction of the present invention, experiments are conducted using the above three data sets longdress_vox10_1300.ply, Shiva35.ply, Queen_frame_0200.ply, and the compression performance is compared with the existing method as shown in FIG. 5.

As can be seen from FIG. 5, on three types of typical point cloud sequences tested, the method provided by the invention has a gain of 1-3 dB under the same code rate point compared with a method without prediction, and the performance advantage is obvious. According to the method, the KD tree is used as a simple division mode, and the high-efficiency redundancy elimination scheme of multi-angle self-adaptive intra prediction is combined, so that the advantages of compression performance are obvious, and the advantages are prominent.

It should be noted that the examples are disclosed to aid in a further understanding of the present invention, but those skilled in the art will appreciate that: various alternatives and modifications are possible without departing from the spirit and scope of the invention and the appended claims. Therefore, it is intended that the invention not be limited to the embodiments disclosed, but that the scope of the invention be determined by the claims appended hereto.

The invention claimed is:

1. A point cloud attribute compression method based on multi-angle self-adaptive intra prediction, aiming at point cloud attribute information, a novel intra prediction scheme based on a block structure being proposed, six prediction modes being provided to reduce redundant information among different coded blocks of a point cloud as much as possible, and compression performance of the point cloud attribute being improved; wherein the method comprises the following steps:

1) Color space conversion of point cloud attributes: reading in point cloud attribute information to-be-processed, and converting a point cloud color space from an RGB space to a YUV space according to the visual characteristics of human eyes and the difficulty in compression processing;

2) Dividing the point cloud by adopting a KD tree to obtain a coded block and numbering the coded blocks according to a breadth traversal sequence: reading in geometric information of the point cloud and carrying out KD tree division on the point cloud according to the geometric information, selecting a coordinate axis with the maximum distribution variance in the point cloud position coordinate as a division axis each time, selecting a point with the coordinate size being a median value as a division point, and iteratively dividing until the set KD tree depth being reached; the block obtained by the last layer of KD tree division being a coded block of the point cloud, and numbering the coded blocks according to the breadth traversal sequence, wherein the numbering is used as a sequence for later processing of the coded blocks;

3) Performing multi-angle self-adaptive intra prediction on the attribute information of the point cloud coded block based on the numbering sequence, wherein six prediction modes are provided:

According to prediction mode 1, 128 is used as the prediction reference value of the Y luminance component of the current block $b_{i+1}$, and the U and V chrominance components are not predicted, which is called "DC mode";

According to prediction mode 2, $Y_{i+1}$, $U_{i+1}$, $V_{i+1}$ are predicted by the mean values $\overline{Y_i}$, $\overline{U_i}$, $\overline{V_i}$ of all the points Y, U, V components reconstructed by the first block $b_i$; according to prediction mode 3, $Y_{i+1}$, $U_{i+1}$, $V_{i+1}$ are predicted by the mean values $\overline{Y_{I-1}}$, $\overline{U_{I-1}}$, $\overline{V_{I-1}}$ of all the points Y, U, V components reconstructed by the first two blocks $b_{i-1}$; according to prediction mode 4, $Y_k$, $U_k$, $V_k$ are predicted by the mean values $\overline{Y_{I-2}}$, $\overline{U_{I-2}}$, $\overline{V_{I-2}}$ of all the points Y, U, V components reconstructed by the first three blocks, and these three prediction modes are multi-angle predictions between KD tree leaf child nodes;

According to prediction mode 5, the mean values $$\overline{Y_{(ceil(\frac{k}{2})-1)}}, \overline{U_{(ceil(\frac{k}{2})-1)}}, \overline{V_{(ceil(\frac{k}{2})-1)}}$$

of all the points Y, U, V components reconstructed using the previous parent node of the previous layer of the KD tree parent node of the current block $b_{i+1}$ is used as the reference value of the $Y_{i+1}$, $U_{i+1}$, $v_{i+1}$ components of the current leaf child nodes for prediction; according to prediction mode 6, the mean values $$\overline{Y_{(ceil(\frac{k}{2})-2)}}, \overline{U_{(ceil(\frac{k}{2})-2)}}, \overline{V_{(ceil(\frac{k}{2})-2)}}$$

of all the points Y, U, V components reconstructed using the forward second parent node of the previous layer of the KD tree parent node of the current block $b_{i+1}$ is used as the reference value of the $Y_{i+1}$, $U_{i+1}$, $V_{i+1}$ components of the current leaf child nodes for prediction; the two prediction modes provide a more flexible prediction scheme for multi-angle prediction across layers between leaf child nodes and parent nodes of the KD tree, and are favorable for removing redundant information from the coded blocks;

When the first coded block $b_1$ is subjected to intra prediction, only prediction mode 1 can be used; when the second coded block $b_2$ is subjected to intra prediction, prediction mode 1 and prediction mode 2 can be predicted; when the third coded block $b_3$ is subjected to intra prediction, prediction mode 1, prediction mode 2, prediction mode 3 and prediction mode 5 can be used; when the fourth coded block $b_4$ is subjected to intra prediction, a prediction mode 1, a prediction mode 2, a prediction mode 3, a prediction mode 4 and a prediction mode 5 can be used; when the coded block $b_k$ numbered $k≥5$ is intra-predicted, six prediction modes can be used;

4) Intra prediction mode decision: for color components $Y_k$, $U_k$, $V_k$ prediction of coded block $b_k$ (k≥2), mode decision is needed to select the optimum prediction mode, while the first coded block does not need to make mode decision; a cost of a prediction mode is estimated using a Sum of Absolute Transformed Difference (SATD) of a prediction residual transform coefficient, wherein the prediction residual is transformed using a Discrete Cosine Transform (DCT); the smaller the SATD value, the fewer code words needed for encoding the prediction residual coefficient, the smaller the distortion introduced by the mode, the better the prediction performance, and therefore the mode with the smallest SATD is selected as the prediction mode of the current block; and 5) Generation of a point cloud attribute compressed code stream: all coded blocks are processed according to a coding sequence, DCT transformation, uniform quantization and entropy coding are carried on the predicted residual to obtain a final code stream with compressed point cloud attributes.

2. The point cloud attribute compression method according to claim 1, wherein the color space conversion in the step 1) comprises the following steps:

Points $p_k$ in the point cloud having color values $r_k$, $g_k$, $b_k$ of an RGB color space, wherein RGB is converted into a YUV color space through Formula 1, and the color values are $y_k$, $u_k$, $v_k$;

$$[y_k, u_k, v_k] = [r_k, g_k, b_k] \times \begin{bmatrix} 0.2126 & 0.7152 & 0.0722 \\ -0.1146 & -0.3854 & 0.5 \\ 0.5 & -0.4542 & -0.0458 \end{bmatrix}. \quad \text{(Formula 1)}$$

3. The point cloud attribute compression method according to claim 1, wherein the KD tree partitioning method in the step 2) being a binary partitioning method, wherein N points are set for the point cloud to be processed, wherein the division depth set by the KD tree is d, and $2^d$ coded blocks are obtained after the point cloud is divided d times; all coded blocks are numbered $b_1$, $b_2$, ..., $b_k$, ..., $b_{2^d}$ in the breadth traversal sequence.

4. The point cloud attribute compression method according to claim 1, wherein the reference value used for intra prediction carried out on the coded block in the step 3) being shown in the following table 1:

TABLE 1

Color component reference values for intra prediction of coded blocks

| Coded blocks $b_k$ | Prediction mode | $Y_k$ reference value | $U_k$ reference value | $V_k$ reference value |
|---|---|---|---|---|
| k = 1 | 1 | 128 | 0 | 0 |
| k = 2 | 1 | 128 | 0 | 0 |
|  | 2 | $\overline{Y_l}$ | $\overline{U_l}$ | $\overline{V_l}$ |
| k = 3 | 1 | 128 | 0 | 0 |
|  | 2 | $\overline{Y_l}$ | $\overline{U_l}$ | $\overline{V_l}$ |
|  | 3 | $\overline{Y_{l-1}}$ | $\overline{U_{l-1}}$ | $\overline{V_{l-1}}$ |
|  | 5 | $\overline{Y_{(ceil(\frac{k}{2})-1)}}$ | $\overline{U_{(ceil(\frac{k}{2})-1)}}$ | $\overline{V_{(ceil(\frac{k}{2})-1)}}$ |

TABLE 1-continued

Color component reference values for intra prediction of coded blocks

| Coded blocks $b_k$ | Prediction mode | $Y_k$ reference value | $U_k$ reference value | $V_k$ reference value |
|---|---|---|---|---|
| k = 4 | 1 | 128 | 0 | 0 |
|  | 2 | $\overline{Y_l}$ | $\overline{U_l}$ | $\overline{V_l}$ |
|  | 3 | $\overline{Y_{l-1}}$ | $\overline{U_{l-1}}$ | $\overline{V_{l-1}}$ |
|  | 4 | $\overline{Y_{l-2}}$ | $\overline{U_{l-2}}$ | $\overline{V_{l-2}}$ |
|  | 5 | $\overline{Y_{(ceil(\frac{k}{2})-1)}}$ | $\overline{U_{(ceil(\frac{k}{2})-1)}}$ | $\overline{V_{(ceil(\frac{k}{2})-1)}}$ |
| k ≥ 5 | 1 | 128 | 0 | 0 |
|  | 2 | $\overline{Y_l}$ | $\overline{U_l}$ | $\overline{V_l}$ |
|  | 3 | $\overline{Y_{l-1}}$ | $\overline{U_{l-1}}$ | $\overline{V_{l-1}}$ |
|  | 4 | $\overline{Y_{l-2}}$ | $\overline{U_{l-2}}$ | $\overline{V_{l-2}}$ |
|  | 5 | $\overline{Y_{(ceil(\frac{k}{2})-1)}}$ | $\overline{U_{(ceil(\frac{k}{2})-1)}}$ | $\overline{V_{(ceil(\frac{k}{2})-1)}}$ |
|  | 6 | $\overline{Y_{(ceil(\frac{k}{2})-2)}}$ | $\overline{U_{(ceil(\frac{k}{2})-2)}}$ | $\overline{V_{(ceil(\frac{k}{2})-2)}}$ |

5. The point cloud attribute compression method of claim 1, wherein the prediction reference values of the color components $Y_k$, $U_k$, $V_k$ of the coded block $b_k$ (k≠1) in the step (4) being $Y_{k\_ref}$, $U_{k\_ref}$, $V_{k\_ref}$ respectively, wherein the prediction residual $b_{k(res)}$ is calculated by Formula 2, the cost SATD of the prediction mode is calculated by Formula 3, and there are the following steps:

$$b_{k(res)} = (Y_k - Y_{k\_ref}) + (U_k - U_{k\_ref}) + (V_k - V_{k\_ref}) \quad \text{(Formula 2)}$$

$$\text{SATD} = \text{sum}(\text{abs}(\text{DCT}(b_{k(res)}))) \quad \text{(Formula 3)}$$

6. The point cloud attribute compression method according to claim 1, wherein the step 5) comprises the following steps:

(6-1) Obtaining coded block prediction residuals with serial numbers and prediction mode information thereof from processing in the steps 1) to 4); carrying out DCT transformation, uniform quantization and binarization on the prediction residual to obtain a code stream of attribute information, and obtaining a final point cloud attribute compressed code stream by combining prediction mode information of a coded block, and through entropy encoding;

(6-2) Code stream of the code stream point cloud attribute information of point cloud attribute information mainly consisting of compressed header information and coded block information, wherein the header information mainly comprises quantization step length and the like; the coded block information stream is arranged in the order of coded blocks in units of coded blocks, and each block mainly comprises prediction mode information and color residual information of the coded blocks;

(6-3) Measuring the performance of the point cloud attribute compression by a code rate and a peak signal to noise ratio (PSNR), wherein the code rate is in bpp (bits per point), and the PSNR is in decibel dB; the smaller the bit rate, the larger the PSNR, the better the compression performance of point cloud performance.

* * * * *